June 27, 1961
B. N. TORELL ET AL
2,989,849
FUEL CONTROL SYSTEM FOR A TWIN SPOOL
GAS TURBINE POWER PLANT
Filed Aug. 4, 1951
3 Sheets-Sheet 1
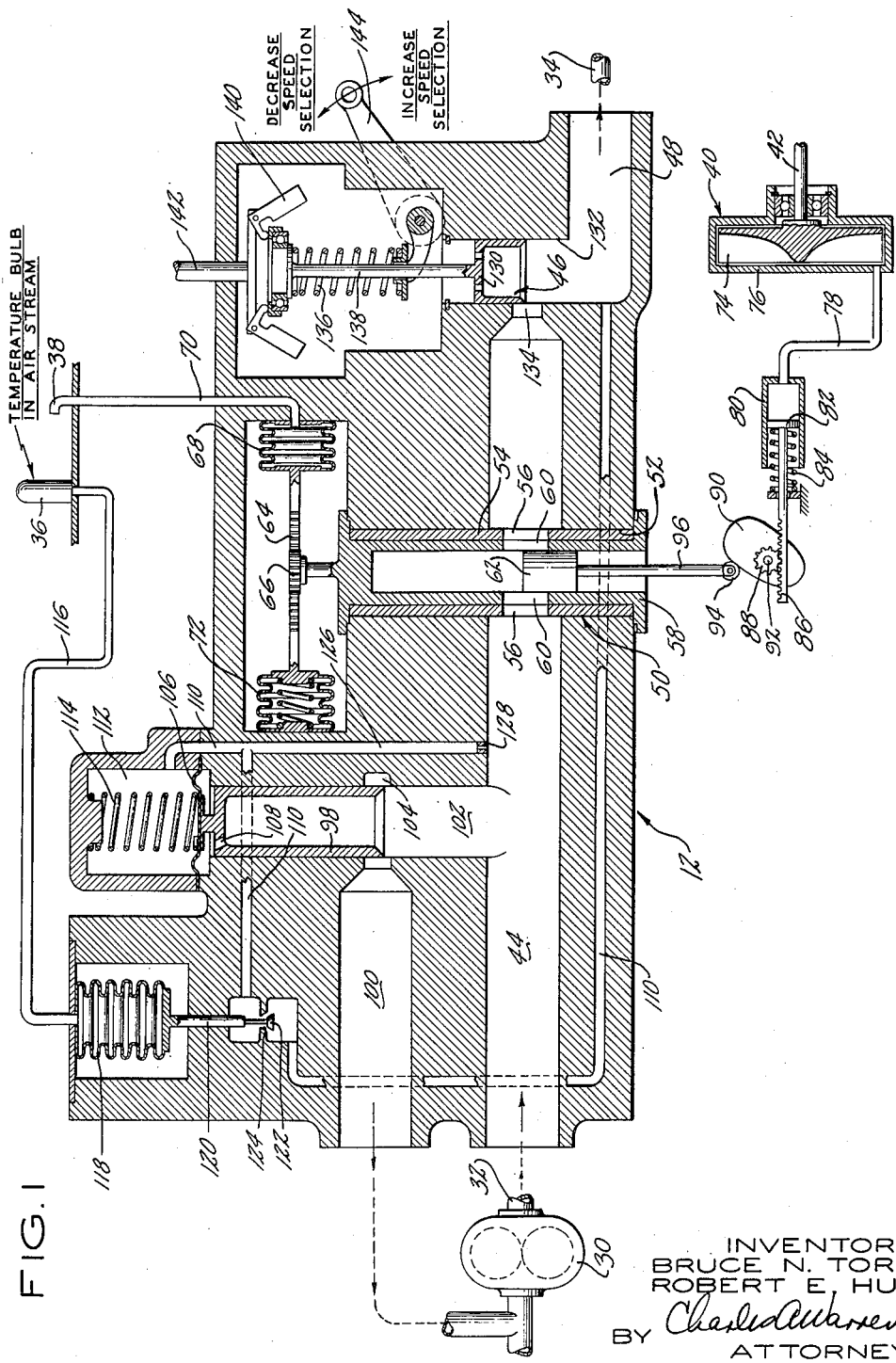
FIG. I
INVENTORS
BRUCE N. TORELL
ROBERT E. HULL
BY *Charles A. Warren*
ATTORNEY

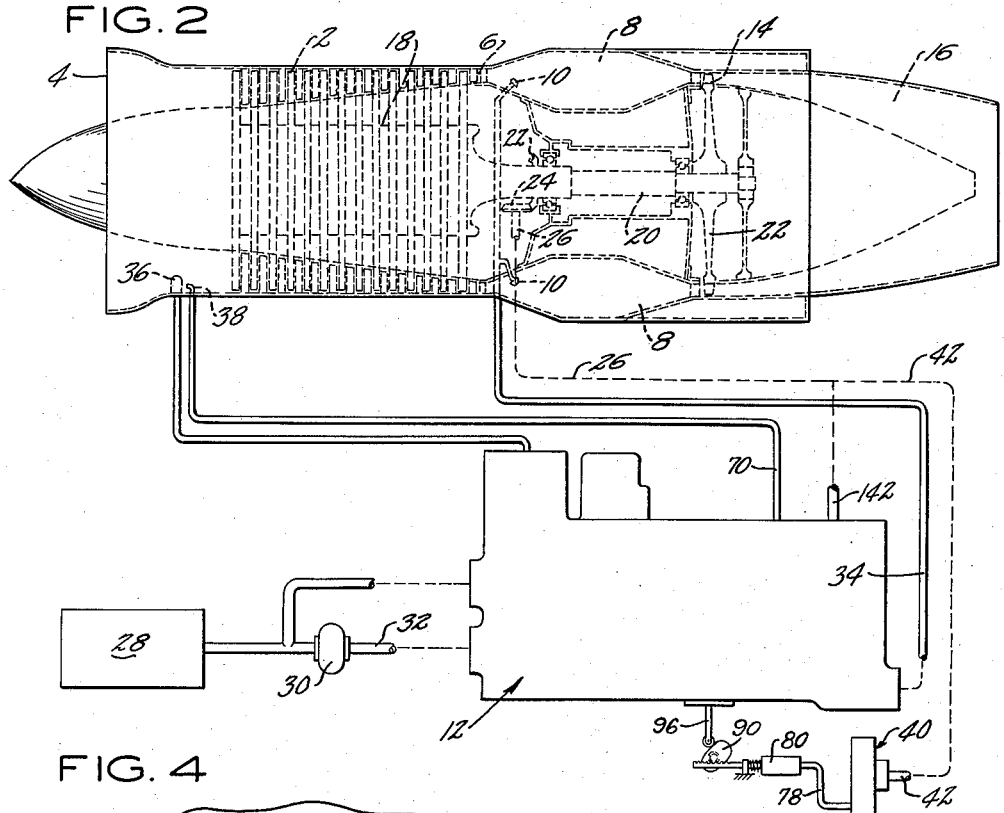
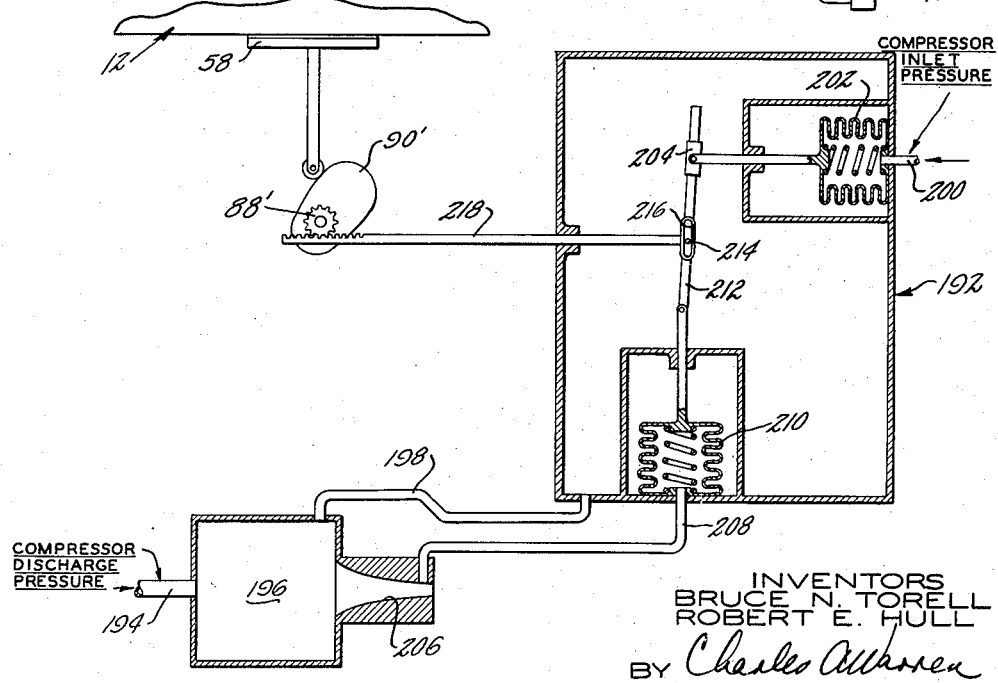

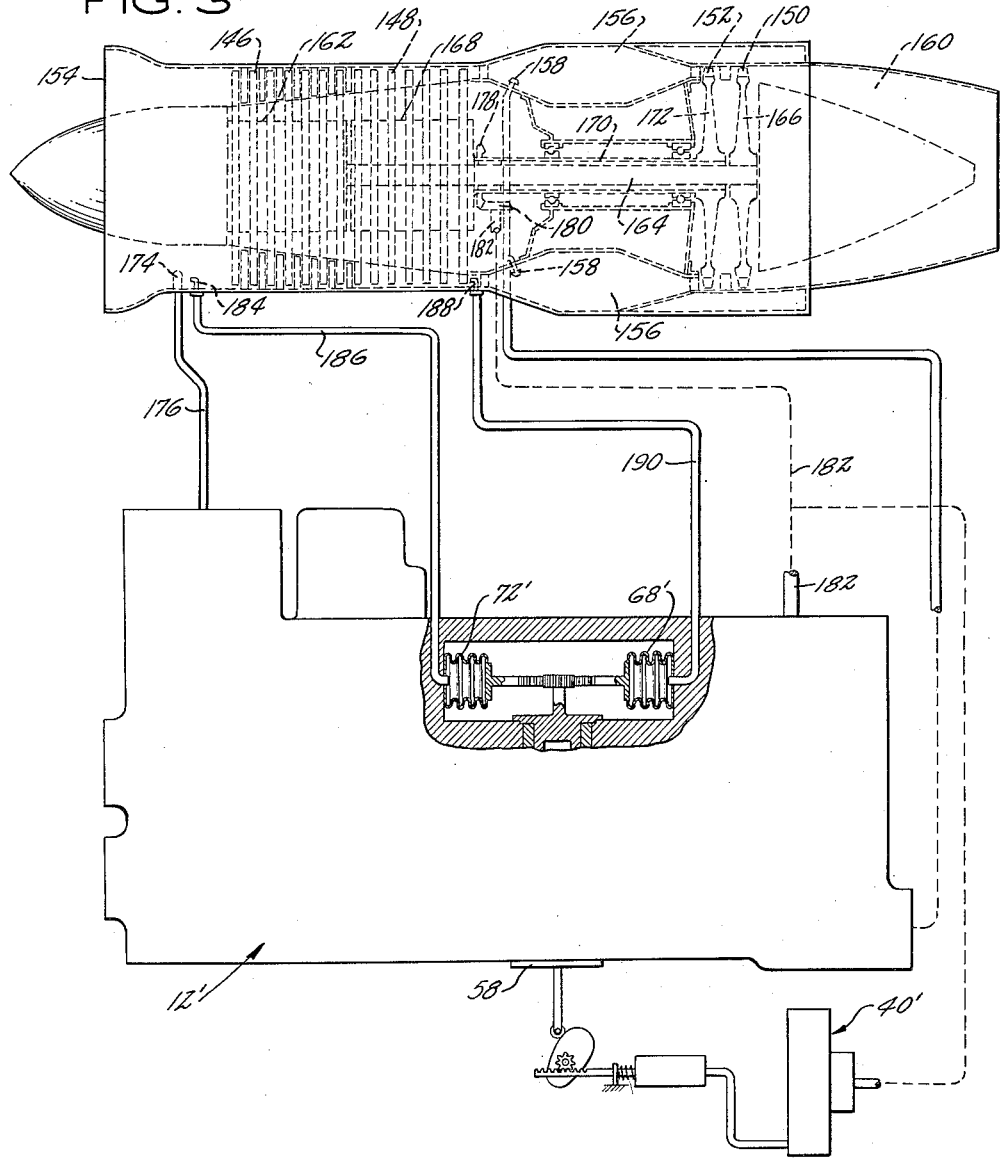

United States Patent Office 2,989,849
Patented June 27, 1961

2,989,849
FUEL CONTROL SYSTEM FOR A TWIN SPOOL GAS TURBINE POWER PLANT
Bruce N. Torell and Robert E. Hull, Wethersfield, Conn., assignors to United Aircraft Corporation, East Hartford, Conn., a corporation of Delaware
Filed Aug. 4, 1951, Ser. No. 240,304
5 Claims. (Cl. 60—39.28)

This invention relates to a fuel control system for gas turbine power plants.

In the operation of gas turbines there is a limiting temperature above which the turbine cannot operate safely at the design speed by reason of the fact that the materials of the turbine lose their strength rapidly above the limiting temperature. In addition, turbine inlet temperature directly affects the back pressure on the compressor and in many gas turbine engines, particularly those of high pressure ratio, it is necessary to limit this back pressure to avoid compressor pulsation or stall. The temperature of the turbine is affected directly by the temperature of the gases entering the turbine, and a control which limits the turbine inlet temperature is accordingly desirable. A feature of this invention is an arrangement of a fuel control which will limit the maximum fuel flow under all operating conditions of the power plant in such a manner that even during acceleration the maximum permissible temperature will not be exceeded.

The true measurement of burner temperature or of turbine inlet temperature is difficult particularly in view of the wide and random variations of temperature across the gas stream at the turbine inlet and the rapid response to temperature which is required in the temperature sensing device in order that the fuel flow may be controlled promptly enough to prevent the gas temperature from exceeding the limit. A feature of the invention is the control of fuel flow to limit the turbine inlet temperature without direct reference to this temperature as a controlling parameter.

There are a number of engine parameters that may be chosen as a means for limiting maximum fuel flow such, for example, as compressor inlet and discharge pressures, compressor inlet and discharge temperatures, turbine inlet temperature or pressure, turbine speed, pressure rise in the compressor or pressure ratio across the compressor. The selection of certain of these parameters for the control of fuel flow must be such that the control will function effectively throughout the entire operating range of the gas turbine and also throughout the entire altitude range in aircraft power plants. The control must operate with a minimum of error in limiting the fuel flow if any of the parameters selected should suddenly be increased to a limit from equilibrium conditions. The control must also operate over the entire range of pressures, temperatures and speeds at which the power plant functions with a minimum of error. A feature of the invention is a control valve for fuel flow which will be responsive to selected variables and which will accomplish the desired control of fuel flow for effective operation of the power plant.

Another feature of the invention is an arrangement of the control valve such that it will vary the fuel flow as a function of the product of certain of the control variables or parameters selected for operating the valve.

One feature of the invention is the inclusion, as one of the parameters to be used for the control, of a temperature indication selected at a point in the power plant where the temperature is not excessive and can be readily measured with conventional temperature sensing devices.

Other objects and advantages will be apparent from the specification and claims, and from the accompanying drawings which illustrate an embodiment of the invention.

FIG. 1 is a diagrammatic sectional view of one form of the control.

FIG. 2 is a view showing the application of the control to a gas turbine power plant.

FIG. 3 is a modified form of the control adapted to a multi-spool power plant, i.e., a power plant in which the compressor and turbine each are split into separate units and one or more turbine stages is connected to and drives one or more compressor stages and the remaining turbine stages are connected to and drive the remaining compressor stages.

FIG. 4 is another modified form of the control adapted to a multi-spool power plant.

With reference first to FIG. 2, the gas turbine power plant includes a compressor 2 having an air inlet 4 at its upstream end and at its delivery end 6 discharging air into the combustor 8. Fuel is supplied to the combustor by a suitable arrangement of nozzles 10, the flow to which is varied by the control 12. This fuel is burned with the air in the combustor and the resulting products of combustion are discharged through a turbine 14 and thence through a thrust nozzle 16. The compressor includes a rotor 18 connected by a shaft 20 to the turbine rotor 22 so that the rotors operate at the same speed. The shaft 20 may carry a bevel gear 23 meshing with a cooperating gear 24 by which the rotor speed may be transmitted through an accessory shaft 26 to the control.

Fuel for the power plant is supplied from a tank 28 to a pump 30 which supplies fuel under pressure through a conduit 32 to the control 12 and from the control through a conduit 34 to the nozzles 10. The function of the control 12 is to vary the fuel flow in such a manner as to prevent the turbine inlet temperature from exceeding the established limit above which the turbine cannot be operated safely and to establish engine operation at the selected speed. In the arrangement of FIGS. 1 and 2, the selected parameters or variables by which the fuel flow limit will be varied are compressor inlet temperature as sensed by a temperature sensing element 36 located at the compressor inlet, as shown, compressor inlet pressure as sensed by a pressure probe 38 located adjacent to the compressor inlet, and turbine rotor speed as sensed by a speed sensing device 40 forming a part of the control 12. The speed function is fed into the speed sensing device 40 through the accessory shaft 26 and an interconnecting shaft 42.

With reference now to FIG. 1, the pressure fuel conduit 32 communicates with a passage 44 in the control 12 and thence past a governing valve 46 to an intercommunicating passage 48 with which conduit 34 connects. The governing valve 46 is conventional and varies the flow of fuel through the control as an inverse function of the speed, as will be described later.

The valve 50 which controls the maximum flow of fuel through the control is located in a bore 52 which intersects the passage 44. The valve 50 includes a liner 54 having aligned rectangular ports 56 therein, a sleeve 58 turnable within the liner and having rectangular ports 60 which are aligned with the ports 56 and a plunger 62 axially slidable within the sleeve and arranged to more or less close the rectangular ports 60. In the arrangement shown sleeve 58 is turned angularly through a rack 64 meshing with a pinion 66 on the end of the sleeve, the rack being moved by compressor inlet pressure supplied to a bellows 68 by a pipe 70 communicating with the pressure tap 38. Although compressor inlet pressure has been selected for the purpose of illustration, it will be understood that another pressure adjacent to or within the compressor might equally well be selected in certain installations. In order that the pressure indication may be an absolute pressure indication, the bellows 68 is opposed by an evacuated bellows 72 connected to the rack 64. Thus as compressor inlet pressure increases the bellows 68 expands and rotates the sleeve 58 in a direction to increase the effective area of the cooperating ports 56 and 60.

The plunger 62 is moved axially as a function of the turbine rotor speed through the turbine rotor speed sensing device 40. This device may be a centrifugal pump 74 located in a case 76, the pump being driven directly from the turbine rotor, as shown, so that the pressure at the periphery of the casing 76 is a function of turbine rotor speed and is transferred through a conduit 78 to a cylinder 80 in which a plunger 82 is positioned. This plunger, which is urged toward the right by a spring 84, carries a rack 86 meshing with a pinion 88. The pinion and a cam 90 are both keyed to the same shaft 92 and the cam engages with a roller 94 on the end of a stem 96 on the valve plunger 62. By properly selecting the contour of the cam 90 the axial position of the plunger 62 may be the desired function of the turbine rotor speed such that as the turbine rotor speed increases, the flow area through the ports 60 is accordingly varied in accordance with engine requirements. It will be understood that as the turbine rotor speed increases, the piston 82 is moved to the left against the spring 84 thereby rotating the cam in a direction to increase the fuel flow. It is apparent that the parameters selected to actuate sleeve 58 and plunger 62 operate contemporaneously. That is, during engine operation the fuel flow through valve 50 may be regulated by separate or simultaneous actuation of sleeve 58 and plunger 62. Also, valves 50 and 46 are operated contemporaneously so that they may be actuated separately or simultaneously to regulate fuel flow.

The pressure drop across valves 46 and 50 may be varied as a function of the compressor inlet temperature. Basically the pressure drop across these valves will be held constant by a pressure responsive valve 98 located in a by-pass 100 from the passage 44 to the inlet to the pump 30. The valve 98 is slidable in a bore 102 in a position to more or less close an annular groove 104 in the bore. Pressure in the passage 44 is transmitted to the under side of a diaphragm 106 through a port 108 in the valve. The other side of the diaphragm is subjected primarily to the pressure downstream of the governing valve 46 through a passage 110 communicating between the passage 48 and the chamber 112 on the upper side of the diaphragm 106. A coil spring 114 determines the basic pressure drop desired across the control valves. As the pressure drop across the fuel control valves increases, the pressure difference across the diaphragm 106 tends to cause the valve 98 to move upwardly thereby by-passing more fuel and tending to restore the desired pressure drop.

The compressor inlet temperature is used as one of the variables which controls the fuel flow and in the arrangement shown functions to vary the pressure drop across valves 46 and 50 as the manner in which the fuel flow will be varied. To accomplish this the temperature sensing element 36 is connected by a conduit 116 to a bellows 118 in the control 12. This bellows carries on its movable end a valve stem 120 having a valve 122 thereon which varies the flow area past a valve seat 124 located in the conduit 110. To keep a flow throughout conduit 110 a by-pass conduit 126 extends from the inlet passage 44 to the conduit 110 upstream of the valve 122 and this conduit 126 has a restricted orifice 128 therein. In this way a fuel flow is urged through conduit 110 and by varying the opening of the valve 122 as a function of compressor inlet temperature, the pressure in chamber 112 acting on the upper side of the diaphragm 106 is also varied as a function of compressor inlet temperature. The pressure variation in chamber 112 affects the position of valve 98 so that the pressure drop across valves 46 and 50 then becomes a function of the compressor inlet temperature. The operation of valve 98 is contemporaneous with the operation of valves 46 and 50 so that the valves or any combination of the valves may operate separately or simultaneously.

It will thus be apparent that the three variables of compressor inlet temperature, compressor inlet pressure and turbine rotor speed are fed into the control 12 contemporaneously, thereby to establish the maximum flow throughout passage 44 to the fuel nozzles. By having the ports 56 and 60 rectangular it will be apparent that the effective port arrangement is a function of the product of compressor inlet pressure and turbine rotor speed provided that the control end of the plunger 62 is flat. This valve 50 therefore establishes the maximum fuel flow which can be utilized by the power plant under any instantaneous operating condition and will prevent the turbine inlet temperature from exceeding the established limit by the control of the flow by the three parameters.

Under most stable operating conditions it will be apparent that the maximum permissible fuel flow is greater than the fuel flow required by the engine to maintain stable operation. Accordingly the turbine control may have in series with the maximum flow valve 50 the governor valve 46 above mentioned. This governor valve is in the form of a plunger 130 slidable in a bore 132 and adapted to more or less close a port 134 in the end of the passage 44. The plunger 130 is urged in a direction to open the port by a spring 136 surrounding the stem 138 on the plunger. The plunger is moved into port closing position by flyweights 140 carried on the end of a shaft 142 connected to the accessory shaft 26 so that the flow area for valve 46 is varied as an inverse function of turbine rotor speed. The desired turbine rotor speed may be varied by adjusting the tension of spring 136 through a lever arm 144 in the usual manner for adjusting a governor.

Referring now to FIG. 3, the control is shown as applied to a twin spool power plant and in which the fuel flow is controlled contemporaneously as a function of compressor inlet temperature, pressure rise across the compressor, and speed of the high pressure compressor. The power plant includes a low pressure compressor 146 and a high pressure compressor 148 driven respectively by the low pressure turbine 150 and by the high pressure turbine 152. Air enters the compressor at the inlet 154 and is discharged into the combustor 156 where fuel is added through a series of nozzles 158. The products of combustion from the combustor discharge through the turbine and through a thrust nozzle 160. The low pressure compressor includes a rotor 162 connected as by a shaft 164 to the low pressure turbine rotor 166. Similarly the high pressure compressor has a rotor 168 connected as by a sleeve 170 to the high pressure turbine rotor 172.

The fuel control 12' for this power plant is similar to the control above described. A temperature sensing device 174 adjacent the compressor inlet is connected by a suitable conduit 176 to the temperature bellows as in FIG. 1. The speed of the high pressure compressor rotor is transmitted as through cooperating bevel gears 178 and 180 and a shaft 182 to the speed sensing device 40'. The pressure parameter used in this control is a pressure rise parameter and to this end a pressure probe 184 adjacent the compressor inlet is connected as by a conduit 186 to a bellows 72' comparable to the bellows 72 above described. A pressure probe 188 adjacent the delivery end of the high pressure compressor is connected as by a conduit 190 to a bellows 68' similar to the bellows 68 above described. With an arrangement of this character the sleeve 58 of the control will be turned as a function of the pressure rise in the compressor rather than as a function of the compressor inlet pressure as in FIG. 1.

It will be understood that the high pressure compressor and the low pressure compressor operate independently of each other with no speed controlling interconnection. In the arrangement shown the speed sensing device is connected with the high pressure compressor rotor. Under certain conditions it may be preferable to incorporate the speed sensing device with the low pressure compressor rotor.

Under certain conditions it might be preferable to use as the control parameters a temperature function, a pressure function, and instead of a speed function a variable such as would be expressed by the equation $1-P_i/P_2$ where $P_i$ represents the compressor inlet pressure and $P_2$ represents the high pressure compressor discharge pressure. This may be accomplished by a modification of the control as best shown in FIG. 4. In this arrangement the control 12 is the same as in FIG. 1 and is interconnected with the power plant in the same manner as described in connection with FIG. 2 except that the speed sensing device 40 is replaced by the pressure sensitive device shown in FIG. 4. Also, the cam 90 is replaced by cam 90' which is machined with the proper contour to give the plunger 62 the desired axial position as a function of $1-P_i/P_2$. The control is accordingly responsive to changes in compressor inlet pressure by turning the sleeve 58 as described above in connection with FIG. 1 and the pressure drop through the control is a function of temperature variation at the compressor inlet also as described above in connection with FIG. 1. The variable expressed by the above equation is used to actuate the plunger 62 through an auxiliary control 192. This control is in the form of a box the interior of which is subjected to compressor discharge pressure. In the arrangement shown the compressor discharge pressure through a duct 194 reaches a box 196 and thence through a conduit 198 to the box 192. Compressor inlet pressure through a duct 200 reaches a bellows 202 within box 192. With this arrangement the motion of a sleeve 204 on the movable end of the bellows 202 is a function of the difference between the compressor discharge pressure and the compressor inlet pressure.

Mounted on one wall of the small box 196 is a sonic nozzle 206 the upstream end of which is accordingly subjected to compressor discharge pressure. The pressure in the throat of the sonic nozzle is transmitted through a conduit 208 to a bellows 210 within the box 192 so that the motion of the free end of this bellows is a function of the pressure difference between compressor discharge pressure and the throat pressure of the sonic nozzle.

The free end of the bellows 210 carries a pivoted rod 212 slidable in the sleeve 204. Between the supports for the rod 212 the latter carries a pin 214 engageable in a slot 216 on the end of the rack 218 which engages with the pinion 88' comparable to the pinion 88 of FIG. 1. With the small sonic nozzle discharging to atmosphere from compressor discharge pressure the motion imparted to the rack 218 by the auxiliary control 192 will be a function of $1-P_i/P_2$.

It is to be understood that the invention is not limited to the specific embodiment herein illustrated and described, but may be used in other ways without departure from its spirit as defined by the following claims.

We claim:
1. A fuel control for a gas turbine power plant including a split multistage compressor, a combustor having a fuel nozzle, and a split multistage turbine, with the low pressure portion of the turbine driving the low pressure portion of the compressor and the high pressure portion of the turbine driving the high pressure portion of the compressor, the speed for each portion of the turbine and attached portion of the compressor being variable and mechanically independent of the other portion, the inlet and discharge pressures for the compressor and the inlet and discharge temperatures for the compressor being variable, the control including valve means for adjusting the supply of fuel to said nozzle and means for contemporaneously adjusting said valve means as a function of variations in pressure in the high pressure portion of the compressor, variations in temperature within the low pressure portion of the compressor, and variations in speed of the high pressure portion of the compressor.

2. A fuel control for a gas turbine power plant including a split multistage compressor having high and low compressor pressure rotors, a combustor having a fuel nozzle, and a split multistage turbine having high and low pressure rotors, the low pressure turbine rotor being connected to and driving the low pressure compressor rotor as a low pressure rotor assembly, and the high pressure turbine rotor connected to and driving the high pressure compressor rotor as a high pressure rotor assembly, the speed for each rotor assembly being variable and being mechanically independent of the other rotor assembly, the inlet and discharge pressures for the compressor and the inlet and discharge temperatures for the compressor being variable, the control including a control valve having a housing with a bore provided with a port through which fuel is supplied to said nozzle, and valve means within said bore having a port cooperating with the port in said valve housing and having rotary and axial movement for varying the effective area of the port, means for sensing the engine operating parameter of variations in pressure in the high pressure portion of the compressor, means for sensing the engine operating parameter of variations in speed of the high pressure portion of the compressor, means for imparting one of said movements to said valve means as a function of one of said parameters, and means for imparting the other of said movements to said valve means as a function of the other of said parameters.

3. A gas turbine power plant including a low pressure compressor, a high pressure compressor, a combustion section, a high pressure turbine driving the high pressure compressor and a low pressure turbine driving the low pressure compressor in combination with a source of pressure fuel for said power plant, a passage between said source and said power plant through which fuel is delivered to said power plant, a maximum flow valve and a governing valve mounted in series in said passage for regulating fuel flow to said power plant, means for contemporaneously adjusting said maximum flow valve in response to at least two of the following parameters of power plant operation, speed of the high pressure compressor, variations in pressure in the high pressure compressor, and pressure rise across both compressors, an increase in any of these parameters being effective to increase fuel flow through said maximum flow valve, means for adjusting said governing valve contemporaneously with said maximum flow valve in response to a parameter of power plant operation, and means for maintaining a constant pressure drop across said valves contemporaneously with the adjustment of the maximum flow valve and the governing valve.

4. A gas turbine power plant including a low pressure compressor, a high pressure compressor, a combustion section, a high pressure turbine driving the high pressure compressor and a low pressure turbine driving the low pressure compressor in combination with a source of pressure fuel for said power plant, a passage between said source and said power plant through which fuel is delivered to said power plant, a maximum flow valve and a governing valve mounted in series in said passage for regulating fuel flow to said power plant, means for contemporaneously adjusting said maximum flow valve in response to at least two of the following parameters of power plant operation, speed of the high pressure compressor, variations in pressure in the high pressure compressor, and pressure rise across both compressors, an increase in any of these parameters being effective to increase fuel flow through said maximum flow valve, means for adjusting said governing valve contemporaneously with said maximum flow valve in response to a parameter of power plant operation, means for maintaining a constant pressure drop across said valves contemporaneously with the adjustment of said valves, and means for biasing said constant pressure drop maintaining means in response to variations in temperature in the low pressure compressor.

5. A fuel control for a gas turbine power plant including a split multistage compressor having high and low compressor pressure rotors, a combustor having a fuel nozzle, and a split multistage turbine having high and low pressure rotors, the low pressure turbine rotor being connected to and driving the low pressure compressor rotor as a low pressure rotor assembly, and the high pressure turbine rotor connected to and driving the high pressure compressor rotor as a high pressure rotor assembly, the speed for each rotor assembly being variable and being mechanically independent of the other rotor assembly, the inlet and discharge pressures for the compressor and the inlet and discharge temperatures for the compressor being variable, the control including a control valve having a housing with a bore provided with a port through which fuel in supplied to said nozzle, and valve means within said bore having a port cooperating with the port in said valve housing and having rotary and axial movement for varying the effective area of the port, means for imparting rotary motion to said valve means as a function of variation of pressure in the high pressure portion of the compressor and means for imparting axial movement to said valve means as function of variations in speed of the high pressure portion of the compressor.

References Cited in the file of this patent

UNITED STATES PATENTS

| | | |
|---|---|---|
| 671,190 | Haigh | Apr. 2, 1901 |
| 1,091,108 | Allen | Mar. 20, 1914 |
| 1,619,948 | Mangiameli | Mar. 8, 1924 |
| 1,898,952 | Gray | Feb. 21, 1933 |
| 1,958,262 | Boland | May 8, 1934 |
| 2,237,784 | Iler | Apr. 8, 1941 |
| 2,243,467 | Jendrassik | May 27, 1941 |
| 2,322,518 | Huber | June 22, 1943 |
| 2,375,204 | Baker | May 8, 1945 |
| 2,422,808 | Stokes | June 24, 1947 |
| 2,471,289 | Sedgwick | May 24, 1949 |
| 2,474,033 | Chamberlin | June 21, 1949 |
| 2,490,726 | Bauberger | Dec. 6, 1949 |
| 2,504,414 | Hawthorne | Apr. 18, 1950 |
| 2,529,973 | Sedille | Nov. 14, 1950 |
| 2,536,158 | Chamberlin | Jan. 2, 1951 |
| 2,545,698 | Holley | Mar. 20, 1951 |
| 2,545,703 | Orr | Mar. 20, 1951 |
| 2,557,526 | Bobier | June 19, 1951 |
| 2,560,118 | Maline | July 10, 1951 |
| 2,581,275 | Mock | Jan. 1, 1952 |
| 2,616,254 | Mock | Nov. 4, 1952 |
| 2,628,472 | Dray et al. | Feb. 17, 1953 |
| 2,638,742 | Carey | May 19, 1953 |
| 2,643,514 | Jubb | June 30, 1953 |
| 2,668,416 | Lee | Feb. 9, 1954 |
| 2,673,556 | Reggio | Mar. 30, 1954 |
| 2,693,081 | Russ | Nov. 2, 1954 |
| 2,705,047 | Williams et al. | Mar. 29, 1955 |

FOREIGN PATENTS

| | | |
|---|---|---|
| 941,556 | France | July 19, 1948 |
| 634,095 | Great Britain | Mar. 15, 1950 |